United States Patent
Thompson

(10) Patent No.: US 11,548,623 B2
(45) Date of Patent: Jan. 10, 2023

(54) AIRCRAFT LANDING GEAR

(71) Applicant: AIRBUS OPERATIONS LIMITED, Bristol (GB)

(72) Inventor: Robert Ian Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 81 days.

(21) Appl. No.: 17/055,816

(22) PCT Filed: May 16, 2019

(86) PCT No.: PCT/GB2019/051336
§ 371 (c)(1),
(2) Date: Nov. 16, 2020

(87) PCT Pub. No.: WO2019/220115
PCT Pub. Date: Nov. 21, 2019

(65) Prior Publication Data
US 2021/0206477 A1 Jul. 8, 2021

(30) Foreign Application Priority Data

May 17, 2018 (GB) .................................... 1808027

(51) Int. Cl.
*B64C 25/60* (2006.01)
*B64C 25/12* (2006.01)
(Continued)

(52) U.S. Cl.
CPC .............. *B64C 25/12* (2013.01); *B64C 25/22* (2013.01); *B64C 25/60* (2013.01); *B64C 25/405* (2013.01)

(58) Field of Classification Search
CPC ......... B64C 25/12; B64C 25/22; B64C 25/60; B64C 25/405
See application file for complete search history.

(56) References Cited

U.S. PATENT DOCUMENTS 1,847,491 A * 3/1932 Messier .................. B64C 25/14
267/64.11
2,487,548 A * 11/1949 Hawkins, Jr. .......... B64C 25/34
244/102 R
(Continued)

FOREIGN PATENT DOCUMENTS

| EP | 2 896 517 | 7/2015 |
|----|-----------|--------|
| EP | 3 388 337 | 10/2018 |
| WO | 96/17770 | 6/1996 |

OTHER PUBLICATIONS

Combined Search and Examination Report for Great Britain Application No. GB1808027.5, seven pages, dated Nov. 20, 2018.
(Continued)

*Primary Examiner* — Tye William Abell
(74) *Attorney, Agent, or Firm* — Nixon & Vanderhye P.C.

(57) ABSTRACT

An aircraft landing gear is disclosed having a first oleo strut include a sleeve portion and a slider portion, the slider portion being slidable within a hydraulic fluid chamber of the sleeve portion, and a second, similar oleo strut. The landing gear also includes a hydraulic fluid balancer having a balance chamber separated into first and second end sections, wherein the hydraulic fluid chamber of the sleeve portion of the first oleo strut is fluidly connected to the first section of the balance chamber and the hydraulic fluid chamber of the sleeve portion of the second oleo strut is fluidly connected to the second section of the balance chamber of the hydraulic fluid balancer.

22 Claims, 5 Drawing Sheets

(51) Int. Cl.
*B64C 25/22* (2006.01)
*B64C 25/40* (2006.01)

(56) References Cited

U.S. PATENT DOCUMENTS

| | | | | |
|---|---|---|---|---|
| 2,863,623 A * | 12/1958 | Lebold | ................... | B64C 25/34 |
| | | | | 244/102 R |
| 3,042,345 A * | 7/1962 | Holland, Jr. | ............ | B64C 25/60 |
| | | | | 244/100 R |
| 2011/0156472 A1* | 6/2011 | Bucheton | ................ | B64C 25/44 |
| | | | | 301/6.2 |
| 2012/0160956 A1* | 6/2012 | Gaia | ..................... | B64C 25/405 |
| | | | | 244/50 |
| 2016/0311525 A1* | 10/2016 | Wilson | .................. | B64C 25/405 |

OTHER PUBLICATIONS

Partial International Search Report for PCT/GB2019/051336, 14 pages, dated Jul. 24, 2019.
International Search Report for PCT/GB2019/051336, dated Sep. 25, 2019, 6 pages.
Written Opinion of the ISA for PCT/GB2019/051336, dated Sep. 25, 2019, 11 pages.
Communication pursuant to Article 94(3) EPC for Application No. EP 19 726 086.2, five pages, dated Jul. 27, 2022.

* cited by examiner

AIRCRAFT LANDING GEAR

CROSS REFERENCE TO RELATED APPLICATIONS

The present application is a National Phase of International Application Number PCT/GB2019/051336 filed May 16, 2019, which designated the U.S. and claims priority benefits from Great Britain Patent Application Number GB 1808027.5 filed May 17, 2018, the entire contents of each of which are hereby incorporated by reference.

BACKGROUND OF THE INVENTION

The present disclosure relates to aircraft landing gears.

The present invention concerns aircraft and their landing gears. More particularly, but not exclusively, this invention concerns an aircraft landing gear comprising a first oleo strut for connecting, towards its upper end, to an airframe of an aircraft and for supporting, towards its lower end, a first axle and a first wheel mountable on the first axle, the first oleo strut comprising a sleeve portion and a slider portion, the slider portion being slidable to act as a piston rod within a hydraulic fluid chamber of the sleeve portion of the first oleo strut, a second oleo strut for connecting, towards its upper end, to an airframe of an aircraft and for supporting, towards its lower end, a second axle and a second wheel mountable on the second axle, the second oleo strut comprising a sleeve portion and a slider portion, the slider portion being slidable to act as a piston rod within a hydraulic fluid chamber of the sleeve portion of the second oleo strut, and a hydraulic fluid balancer comprising a balance chamber.

The invention also concerns an aircraft landing gear comprising at least one landing gear strut for connecting towards its upper end to an airframe of an aircraft, an axle mounted towards a lower end of the strut, the axle being rotatably mounted to the strut such that it can rotate about an axle longitudinal axis, and a wheel fixedly mounted on the axle such that it rotates with the axle about the axle longitudinal axis.

The main landing gear of the Valiant Vickers 1940's aircraft used a hydraulic fluid balancer. However, the inventors have found that it is possible to improve on the shock absorber break-out load, touchdown hardness, dynamic landing loads and weight on wheels (WoW) detection. In addition, the inventors have discovered that the degree of redundancy of the landing gear arrangement can be improved on.

A so-called "live axle" landing gear is known. However, the inventors have realised that the arrangement can be improved to give greater flexibility for drive and/or brake mechanisms.

The present invention seeks to mitigate the above-mentioned problems. Alternatively or additionally, the present invention seeks to provide an improved aircraft landing gear.

SUMMARY OF THE INVENTION

The present invention provides, according to a first aspect, an aircraft landing gear comprising a first oleo strut for connecting, towards its upper end, to an airframe of an aircraft and for supporting, towards its lower end, a first axle and a first wheel mountable on the first axle, the first oleo strut comprising a sleeve portion and a slider portion, the slider portion being slidable (to act as a piston rod), for example, the slider portion may be a piston rod, within a hydraulic fluid chamber of the sleeve portion of the first oleo strut, a second oleo strut for connecting, towards its upper end, to an airframe of an aircraft and for supporting, towards its lower end, a second axle and a second wheel mountable on the second axle, the second oleo strut comprising a sleeve portion and a slider portion, the slider portion being slidable (to act as a piston rod), for example, the slider portion may be a piston rod, within a hydraulic fluid chamber of the sleeve portion of the second oleo strut, a hydraulic fluid balancer comprising a balance chamber and at least one separator piston, the separator piston fluidly separating the balance chamber into first and second end sections, the first end section being located on a first side of the separator piston and the second end section being located on a second opposite side of the separator piston, wherein the hydraulic fluid chamber of the sleeve portion of the first oleo strut is fluidly connected to the first section of the balance chamber of the hydraulic fluid balancer and wherein the hydraulic fluid chamber of the sleeve portion of the second oleo strut is fluidly connected to the second section of the balance chamber of the hydraulic fluid balancer.

For such a landing gear, when coming into land in a normal "aircraft tail down" landing, a rear wheel (on a rear oleo strut) would touchdown first. This would mean that the hydraulic fluid in the sleeve portion of the rear oleo strut is effectively compressed at reduced stiffness, resulting in a low shock absorber break-out load and a softer touchdown for the aircraft. The low shock absorber break-out load also reduces the dynamic landing loads and weight on wheels (WoW) detected is improved. The landing gear also offers a greater degree of redundancy.

The sleeve portion may be an upper portion of each oleo strut. The slider portion may be a lower portion of each oleo strut.

Preferably, the hydraulic fluid balancer comprises a second separator piston in the balance chamber such that the balance chamber is fluidly separated into three sections; the first end section located between the first separator piston and a first end of the balance chamber, the second end section located between the second separator piston and a second opposite end of the balance chamber, and a third middle section located between the first and second separator pistons. Such a two-stage shock absorber may allow for smoother landing, taxiing etc.

More preferably, the third middle section comprises a fluid different to a hydraulic fluid in the first and/or second end sections. Having a different fluid (with a different composition) may allow for different shock absorbing properties (stiffness) at different stages in loading and so a designer can tailor the shock absorbing properties depending on amount of fluid in each section. For example, one fluid could be liquid and one could be gas.

The fluid in the third middle section may be a gas, such as air.

Preferably, hydraulic fluid in the first and/or second end section comprises a liquid, such as oil.

Preferably, the slider portion of the first and/or second oleo strut comprises one or more slider fluid chambers.

Preferably, the landing gear further comprises a frame including a number of bracing struts (at least one) between the first and second oleo struts. The bracing struts may be made of composite material. The bracing struts may provide an efficient bracing structure, able to deliver ground loads to the airframe of the aircraft in a well-distributed manner. This may enable a relatively lightweight and lower cost, more optimised airframe to be used.

More preferably, the balance chamber of the hydraulic fluid balancer is located within a bracing strut of the frame.

This allows for the hydraulic fluid balancer to be hidden and therefore provide a lower drag profile.

Even more preferably, the bracing strut containing the balance chamber is connected towards an upper end of the first and second oleo struts and acts to connect the first and second oleo struts to the airframe. The bracing strut (and hydraulic fluid balancer) may therefore be mounted within or adjacent to the airframe and may enable the hydraulic fluid balance to be easier to maintain and access.

Even more preferably, the bracing strut containing the balance chamber is for pivotally mounting to the airframe such that, in use, the landing gear can pivot about the bracing strut between stowed and deployed positions with respect to the airframe. This provides an efficient retractable landing gear arrangement.

Preferably, each of the first and second oleo struts provide an axle support defining a longitudinal axis of an axle to be supported by the axle support and wherein the two axle longitudinal axes both define a same fore-aft rolling direction for wheels mounted on the axles, and wherein the first and second oleo struts are substantially in line with each other in the fore-aft rolling direction. In other words, the landing gear has a tandem wheels configuration, with a front oleo strut and a rear oleo strut. This provides a low drag profile, and may be easier to fit into the aircraft undercarriage when retracted.

Alternatively, each of the first and second oleo struts provide an axle support defining a longitudinal axis of an axle to be supported by the axle support and wherein the longitudinal axes of the two axles both define a same fore-aft rolling direction for wheels mounted on the axles, and wherein the first and second oleo struts are substantially in line with each other along an axis perpendicular to the fore-aft rolling direction. In other words, the landing gear has a twin wheels configuration, with a left side oleo strut and a right side oleo strut.

Preferably, the landing gear comprises a stirrup connector for connecting the first and/or second oleo struts to the corresponding supported axle, wherein the connection point of the stirrup connector with the first and/or second oleo strut is offset from the connection point of the stirrup connector with the axle. This allows the wheel/tyre offset (from the strut longitudinal axis) to be minimised. This means a lower torque is generated during braking.

More preferably, the two connection points are offset in a direction corresponding to a longitudinal axis of the first and/or second oleo strut and offset in a direction perpendicular to the longitudinal axis of the first and/or second oleo strut. The offset in the direction perpendicular to the longitudinal axis of the first and/or second oleo strut may also be in the direction perpendicular to the fore-aft rolling direction.

Preferably, the landing gear comprises an axle supported on the first or second oleo strut and wherein a drive mechanism for driving rotation of the first or second wheel is mounted on the axle. In other words, preferably, the axle of the first or second oleo strut has a drive mechanism mounted thereon, the drive mechanism being for driving rotation of the (first or second) wheel mounted on that axle. This allows wheels on the struts to be driven by a motor, and not using aircraft engines. Here, which of the first or second wheel is meant is dependent on which oleo strut/axle (i.e. first or second) is meant. In other words, if the drive mechanism is for driving the first wheel, it will be mounted on the first axle. If the drive mechanism is for driving the second wheel, it will be mounted on the second axle. Of course, a driving mechanism may be mounted on both first and second axles for driving both first and second wheels.

More preferably, a braking device, for slowing rotation of the first or second wheel, is also mounted on the axle and wherein the drive mechanism is mounted on the axle on one side of the connection point of the stirrup connector with the axle and the braking device is mounted on the axle on the opposite side of the connection point of the stirrup connector with the axle. This allows the drive mechanism to be able to be mounted away from (the generally hot in use) braking device. This reduces the thermal risk to the motor of the drive mechanism, and in particular copper windings of the motor. Of course, a braking device may be mounted on both first and second axles for slowing rotation of both first and second wheels.

More preferably, the driving mechanism and/or braking device is mounted on an outside of the stirrup connector and the wheel is mounted on an inside of the stirrup connector. The braking device may be mounted on the outside of the stirrup connector. The driving mechanism may be mounted on the inside of the stirrup connector.

Even more preferably, the wheel is located substantially in line with a longitudinal axis of the first and/or second oleo strut. This allows the wheel/tyre offset (from the strut longitudinal axis) to be minimised. This means a lower torque is generated during braking.

Preferably, the landing gear comprises an axle mounted towards a lower end of the first or second oleo strut, the axle being rotatably mounted to the first or second oleo strut such that it can rotate about an axle longitudinal axis, a wheel fixedly mounted on the axle such that it rotates with the axle about the axle longitudinal axis, and a drive mechanism, for driving rotation of the axle, and/or a braking device, for slowing rotation of the axle, the drive mechanism and/or braking device being mounted on the axle. In other words, preferably, the axle of the first or second oleo strut is rotatably mounted to its (first or second) oleo strut such that it can rotate about an axle longitudinal axis, and the wheel of the first or second oleo strut is fixedly mounted on the axle such that it rotates with the axle about the axle longitudinal axis, the landing gear further comprising a drive mechanism, for driving rotation of the axle and/or a braking device, for slowing rotation of the axle, the drive mechanism and/or braking device being mounted on the axle. One such axle may be mounted to the first oleo strut and another such axle may be mounted to the second oleo strut.

This is known as a "live axle" arrangement and may be more stable and less susceptible to shimmy/dynamic instability. Having the driving mechanism and/or braking device on the "live" axle allows them to be moved from inside or adjacent the wheel hub and so gives greater flexibility in the arrangement and improved maintainability/inspection. For example, clamping bolts may be more readily accessible and wheels and brakes can be accessed and changed independently. This may lead to replacement times being improved. In addition, there may be improved brake cooling and the braking device and/or driving mechanism may be better optimised as they are no longer constrained by wheel geometry. For example, a braking device may have larger diameter and higher aspect ratio than when it was located within a wheel. This means fewer rotors and stators are required. In addition, the wheel geometry may be better optimised with improved bearing loadings. The driving mechanism may also be able to drive the axle directly, so negating the need for complex gearbox and/or clutch arrangements. This may give a lower weight landing gear, as well as improved safety. There may also be no need to mechanically disengage the driving mechanism when it is not driving. Also, the drive mechanism may be mounted away from (the generally hot in use) braking device. This reduces the thermal risk to the motor of the drive mechanism, and in particular copper windings of the motor.

According to a second aspect of the invention there is also provided an aircraft landing gear comprising at least one landing gear strut for connecting towards its upper end to an airframe of an aircraft, an axle mounted towards a lower end of the strut, the axle being rotatably mounted to the strut such that it can rotate about an axle longitudinal axis, a wheel fixedly mounted on the axle such that it rotates with the axle about the axle longitudinal axis, and a drive mechanism, for driving rotation of the axle, and/or a braking device, for slowing rotation of the axle, the drive mechanism and/or braking device being mounted on the axle.

This is known as a "live axle" arrangement and may be more stable and less susceptible to shimmy/dynamic instability. Having the driving mechanism and/or braking device on the "live" axle allows them to be moved from inside or adjacent the wheel hub and so gives greater flexibility in the arrangement and improved maintainability/inspection. For example, clamping bolts may be more readily accessible and wheels and brakes can be accessed and changed independently. This may lead to replacement times being improved. In addition, there may be improved brake cooling and the braking device and/or driving mechanism may be better optimised as they are no longer constrained by wheel geometry. For example, a braking device may have larger diameter and higher aspect ratio than when it was located within a wheel. This means fewer rotors and stators are required. In addition, the wheel geometry may be better optimised with improved bearing loadings. The driving mechanism may also be able to drive the axle directly, so negating the need for complex gearbox and/or clutch arrangements. This may give a lower weight landing gear, as well as improved safety. There may also be no need to mechanically disengage the driving mechanism when it is not driving. Also, the drive mechanism may be mounted away from (the generally hot in use) braking device. This reduces the thermal risk to the motor of the drive mechanism, and in particular copper windings of the motor.

The landing gear may comprise two such landing gear struts, axles, wheels, and drive mechanism and/or braking device. The landing gear strut of this second aspect may be the first and/or second oleo strut of the first aspect. In other words, one or both of the first and second oleo struts may have a "live axle".

Preferably, the landing gear comprises a stirrup connector for connecting the landing gear strut to the axle, wherein the connection point of the stirrup connector with the landing gear strut is offset from the connection point of the stirrup connector with the axle. This allows the wheel/tyre offset (from the strut longitudinal axis) to be minimised. This means a lower torque is generated during braking.

More preferably, the two connection points are offset in a direction corresponding to a longitudinal axis of the landing gear strut and offset in a direction perpendicular to the longitudinal axis of the landing gear strut. The offset in the direction perpendicular to the longitudinal axis of the landing gear strut may also be in the direction perpendicular to the fore-aft rolling direction.

Preferably, the landing gear comprises both a drive mechanism for driving rotation of the wheel and a braking device, for slowing rotation of the wheel, wherein the drive mechanism is mounted on the axle on one side of a mounting point of the axle to the strut and the braking device is mounted on the axle on the opposite side of the mounting point of the axle to the strut. This allows the drive mechanism to be able to be mounted away from (the generally hot in use) braking device. This reduces the thermal risk to the motor of the drive mechanism, and in particular copper windings of the motor.

More preferably, the drive mechanism is mounted on the axle on one side of the connection point of the stirrup connector with the axle and the braking device is mounted on the axle on the opposite side of the connection point of the stirrup connector with the axle.

Even more preferably, the driving mechanism and/or braking device is mounted on an outside of the stirrup connector and the wheel is mounted on an inside of the stirrup connector. The braking device may be mounted on the outside of the stirrup connector. The driving mechanism may be mounted on the inside of the stirrup connector.

Even more preferably, the wheel is located substantially in line with a longitudinal axis of the landing gear strut. This allows the wheel/tyre offset (from the strut longitudinal axis) to be minimised. This means a lower torque is generated during braking.

Alternatively, one of the driving mechanism and braking device is mounted on an outside of the stirrup connector and the other of the driving mechanism and braking device is mounted on an inside of the stirrup connector, and wherein the combined centre of the other of the driving mechanism and braking device and the wheel is located substantially in line with a longitudinal axis of the landing gear strut. This minimises the drag profile of the landing gear.

Preferably, the axle is rotatably mounted to the strut by bearings.

Preferably, the landing gear strut is a first oleo strut comprising a sleeve portion and a slider portion, the slider portion being slidable (to act as a piston rod), for example, the slider portion may be a piston rod, within a hydraulic fluid chamber of the sleeve portion of the first oleo strut, and wherein the landing gear further comprises a second oleo strut for connecting, towards its upper end, to an airframe of an aircraft and for supporting, towards its lower end, a second axle and a second wheel mountable on the second axle, the second oleo strut comprising a sleeve portion and a slider portion, the slider portion being slidable (to act as a piston rod), for example, the slider portion may be a piston rod, within a hydraulic fluid chamber of the sleeve portion of the second oleo strut, a hydraulic fluid balancer comprising a balance chamber and at least one separator piston, the separator piston fluidly separating the balance chamber into first and second end sections, the first end section being located on a first side of the separator piston and the second end section being located on a second opposite side of the separator piston, wherein the hydraulic fluid chamber of the sleeve portion of the first oleo strut is fluidly connected to the first section of the balance chamber of the hydraulic fluid balancer and wherein the hydraulic fluid chamber of the sleeve portion of the second oleo strut is fluidly connected to the second section of the balance chamber of the hydraulic fluid balancer.

For such a landing gear, when coming into land in a normal "aircraft tail down" landing, a rear wheel (on a rear oleo strut) would touchdown first. This would mean that the hydraulic fluid in the sleeve portion of the rear oleo strut is effectively compressed at reduced stiffness, resulting in a low shock absorber break-out load and a softer touchdown for the aircraft. The low shock absorber break-out load also reduces the dynamic landing loads and weight on wheels (WoW) detected is improved. The landing gear also offers a greater degree of redundancy.

The sleeve portion may be an upper portion of each oleo strut. The slider portion may be a lower portion of each oleo strut.

Preferably, the landing gear further comprises a frame including a number of bracing struts (at least one) between the first and second oleo struts. The bracing struts may be made of composite material. The bracing struts may provide an efficient bracing structure, able to deliver ground loads to the airframe of the aircraft in a well-distributed manner. This may enable a relatively lightweight and lower cost, more optimised airframe to be used.

More preferably, the balance chamber of the hydraulic fluid balancer is located within a bracing strut of the frame. This allows for the hydraulic fluid balancer to be hidden and therefore provide a lower drag profile.

Even more preferably, the bracing strut containing the balance chamber is connected towards an upper end of the first and second oleo struts and acts to connect the first and second oleo struts to the airframe. The bracing strut (and hydraulic fluid balancer) may therefore be mounted within or adjacent to the airframe and may enable the hydraulic fluid balance to be easier to maintain and access.

Even more preferably, the bracing strut containing the balance chamber is for pivotally mounting to the airframe such that, in use, the landing gear can pivot about the bracing strut between stowed and deployed positions with respect to the airframe. This provides an efficient retractable landing gear arrangement.

According to a third aspect of the invention there is also provided an aircraft landing gear assembly comprising a first leg for supporting a first wheel at a lower end of the first leg, a second leg for supporting a second wheel at a lower end of the second leg, and a common shock absorbing unit comprising a first hydraulic fluid chamber associated with the first leg, a second hydraulic fluid chamber associated with the second leg, and a compressible gas chamber which separates the first hydraulic fluid chamber from the second hydraulic fluid chamber, wherein in use, loading of the first leg is accommodated by compression of gas in the compressible gas chamber caused by movement of hydraulic fluid into the first hydraulic fluid chamber, and loading of the second leg is accommodated by compression of gas in the compressible gas chamber caused by movement of hydraulic fluid into the second hydraulic fluid chamber.

For such a landing gear, when coming into land in a normal "aircraft tail down" landing, a rear wheel (on a rear oleo strut) would touchdown first. This would mean that the hydraulic fluid in the rear oleo strut is effectively compressed at reduced stiffness, resulting in a low shock absorber break-out load and a softer touchdown for the aircraft. The low shock absorber break-out load also reduces the dynamic landing loads and weight on wheels (WoW) detected is improved. The landing gear also offers a greater degree of redundancy.

A sleeve portion may be an upper portion of each oleo strut. A slider portion may be a lower portion of each oleo strut.

According to a fourth aspect of the invention there is also provided an aircraft landing gear comprising at least one landing gear strut for connecting towards its upper end to an airframe of an aircraft, a live axle mounted towards a lower end of the strut, the axle being rotatably mounted to the strut such that it can rotate about an axle longitudinal axis, a wheel fixedly mounted on the live axle such that it rotates with the axle about the axle longitudinal axis, and a drive mechanism, for driving rotation of the axle, and/or a braking device, for slowing rotation of the axle, the drive mechanism and/or braking device being mounted on the axle.

This "live axle" arrangement may be more stable and less susceptible to shimmy/dynamic instability. Having the driving mechanism and/or braking device on the "live" axle allows them to be moved from inside or adjacent the wheel hub and so gives greater flexibility in the arrangement and improved maintainability/inspection. For example, clamping bolts may be more readily accessible and wheels and brakes can be accessed and changed independently. This may lead to replacement times being improved. In addition, there may be improved brake cooling and the braking device and/or driving mechanism may be better optimised as they are no longer constrained by wheel geometry. For example, a braking device may have larger diameter and higher aspect ratio than when it was located within a wheel. This means fewer rotors and stators are required. In addition, the wheel geometry may be better optimised with improved bearing loadings. The driving mechanism may also be able to drive the axle directly, so negating the need for complex gearbox and/or clutch arrangements. This may give a lower weight landing gear, as well as improved safety. There may also be no need to mechanically disengage the driving mechanism when it is not driving. Also, the drive mechanism may be mounted away from (the generally hot in use) braking device. This reduces the thermal risk to the motor of the drive mechanism, and in particular copper windings of the motor.

The landing gear may comprise two such landing gear struts, axles, wheels, and drive mechanism and/or braking device. The landing gear strut of this fourth aspect may be the first and/or second oleo strut of the first aspect or first and/or second leg of the third aspect. In other words, one or both of the first and second oleo struts/legs may have a "live axle".

According to a fifth aspect of the invention there is also provided an aircraft landing gear as described above, wherein the landing gear is a main landing gear.

According to a sixth aspect of the invention there is also provided an aircraft comprising the landing gear as described above.

Preferably, the aircraft is a passenger aircraft.

According to a seventh aspect of the invention there is also provided a method of changing the speed of an aircraft on the ground, the aircraft being supported by one or more landing gears, at least one landing gear comprising an axle having a rotational axis and being supported in a bearing assembly to allow rotation of the axle about the rotational axis, and a wheel fixedly mounted on the axle such that it rotates with the axle about the rotational axis, the method comprising a step of directly changing the speed of rotation of the axle, thus changing the speed of rotation of the wheel and the speed of the aircraft.

Preferably, the step of directly changing the speed of rotation of the axle is performed by means of applying a braking force directly to the axle.

Alternatively, the step of directly changing the speed of rotation of the axle is performed by means of applying a driving force directly to the axle.

According to an eighth aspect of the invention there is also provided a method of absorbing a shock experienced by an aircraft landing gear assembly, the landing gear comprising first and second legs and a common shock absorbing unit comprising a first hydraulic fluid chamber associated with the first leg, a second hydraulic fluid chamber associated with the second leg, and a compressible gas chamber which separates the first hydraulic fluid chamber from the second hydraulic fluid chamber, the method comprising the step of absorbing a shock load experienced by the first leg by compression of gas in the compressible gas chamber caused by movement of hydraulic fluid into the first hydraulic fluid chamber, or absorbing a shock load experienced by the second leg by compression of gas in the compressible gas chamber caused by movement of hydraulic fluid into the second hydraulic fluid chamber.

It will of course be appreciated that features described in relation to one aspect of the present invention may be incorporated into any of the other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
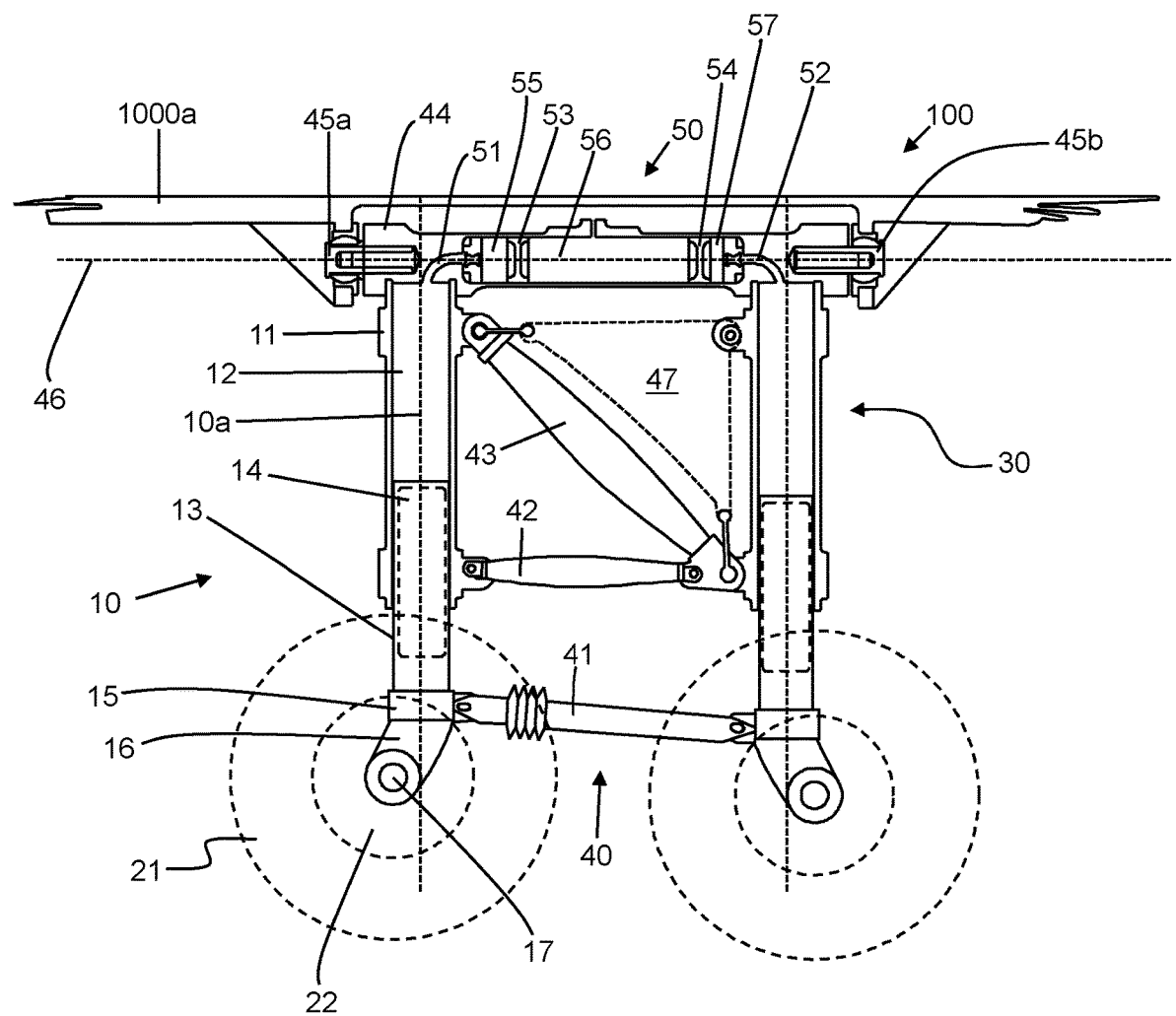
FIG. 1 shows a right side view of a left side main aircraft landing gear according to a first embodiment of the invention.

FIG. 1 shows a right side view of a left side main aircraft landing gear 100 according to a first embodiment of the invention. The landing gear 100 is attached to an airframe 1000a of an aircraft 1000.

The landing gear 100 has two landing gear legs or struts; a front strut 10 and a rear strut 30. The struts are similar, and the front strut 10 will be described now.

The front strut 10 has an upper sleeve portion 11 with a chamber 12 inside it. The chamber 12 holds hydraulic fluid (in this case oil). A lower slider portion 13 is able to slide up and down (in and out) of the sleeve portion 11. The slider portion 13 has a "gas stage" 14 within it. There is also an attachment flange 15 at the lowermost end of the slider portion 13. The front strut 10 provides a strut longitudinal axis, denoted as 10a.

Figure 2:
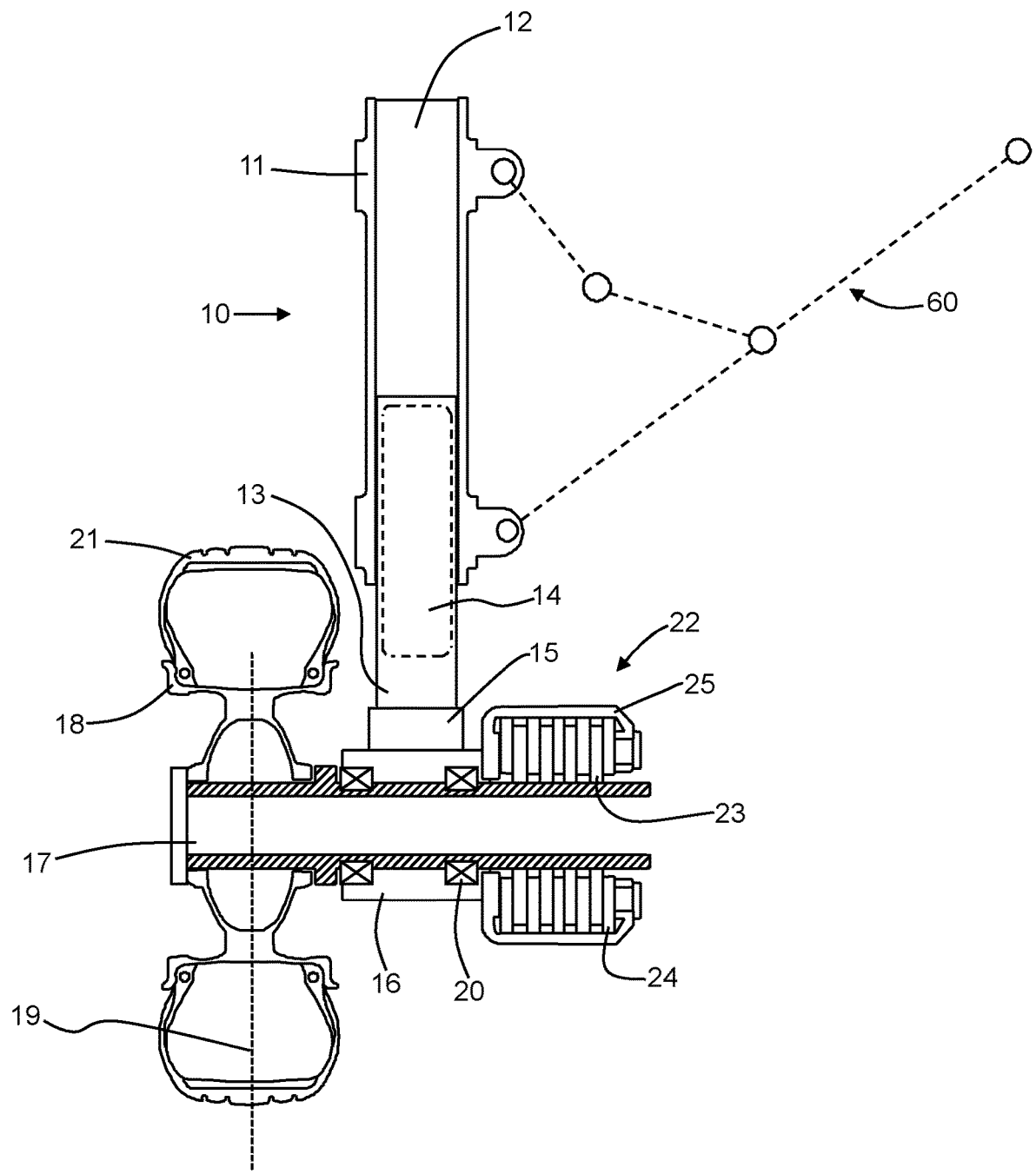
FIG. 2 shows a front view of the aircraft landing gear of FIG. 1.

As can be seen in FIG. 1, and also FIG. 2 (that shows a front view of the aircraft landing gear 100), the attachment flange 15 connects to an axle support 16. The axle support 16 connects to and supports an axle 17 which extends across the front of the landing gear 100. In other words, the axle 17 extends into the page, as shown in FIG. 1 and in a direction perpendicular to the longitudinal axis of the aircraft the landing gear would be attached to. The axle 17 is mounted in the axle support 16 by bearings 20 to allow the axle to freely rotate with respect to the strut 10. This is known as a "live axle" arrangement.

A wheel hub 18 is fixedly mounted on the axle outside of the strut 10 and a tyre 21 is attached around the wheel hub 18. The wheel has a wheel centre axis, denoted as 19 in FIG. 2, corresponding to the central width line of the wheel 18.

On the inside of the axle (the opposite side of the strut 10), there is mounted a braking device 22. The braking device 22 has a number of alternate rotors 23 and stators 24 in a casing 25. These are used to electromagnetically retard rotation of the axle 17 with respect to the strut 10. To do this, the rotors 23 are connected to the axle 17 and the stators 24 are connected to the axle support 16 (and therefore the strut 10) via the casing 25.

As can be seen in FIG. 1, the rear strut 30 is similar to the front strut 10 and will not be described separately.

A bracing frame 40 is used to connect the landing gear struts 10, 30 together and to attach the landing gear 10 to the aircraft airframe 1000a. The bracing frame 40 acts to react fore/aft ground loads. The bracing frame 40 included a torque link 41 connecting between the attachment flanges 15 of the two struts 10, 30. A lower brace 42 is used to connect the two struts 10, 30 at a lower end of their sleeve portions 11. A diagonal central brace is used to connect an upper end of the slider portion 11 of the front strut with a lower end of the slider portion of the rear strut 30. Finally, an upper brace 44 is used to connect the upper ends of the two slider portions 11. The different elements of the bracing frame 40 may be made of composite material.

A systems platform 47 can be attached in a space above the diagonal central brace 43, as shown in FIG. 1.

The upper brace 44 is pivotally mounted at pivot connections 45a, 45b to the airframe 1000a of the aircraft 1000. The upper brace 44 can therefore pivot about pivot axis 46. A foldable side stay 60 (shown in FIG. 2 attached to the front strut 10) is used to actuate and control the rotation of the landing gear 10 about the pivot axis 46, to enable retraction and extension of the landing gear 10. It is also used to brace against lateral and torsional loads.

Within the upper brace 44 is a shock absorber cylinder 50. The cylinder 50 has a chamber within it and this chamber is divided into three sections 55, 56, 57 by two separator pistons 53, 54. Front end section 55 is to the left of the first separator piston, towards the front leg 10, as seen in FIG. 1. Middle section 56 is in between the two separator pistons 53, 54 and rear end section 57 is to the right of the second separator piston, towards the rear leg 30, as seen in FIG. 1. A fluid tube 51 is connected to the front end section 55 and is a fluid connection to the chamber 12 of the sleeve portion 11 of the front leg 10. A similar fluid tube 52 is connected to the rear end section 55 and is a fluid connection to the chamber 12 of the sleeve portion 11 of the rear leg 30.

Figure 3:
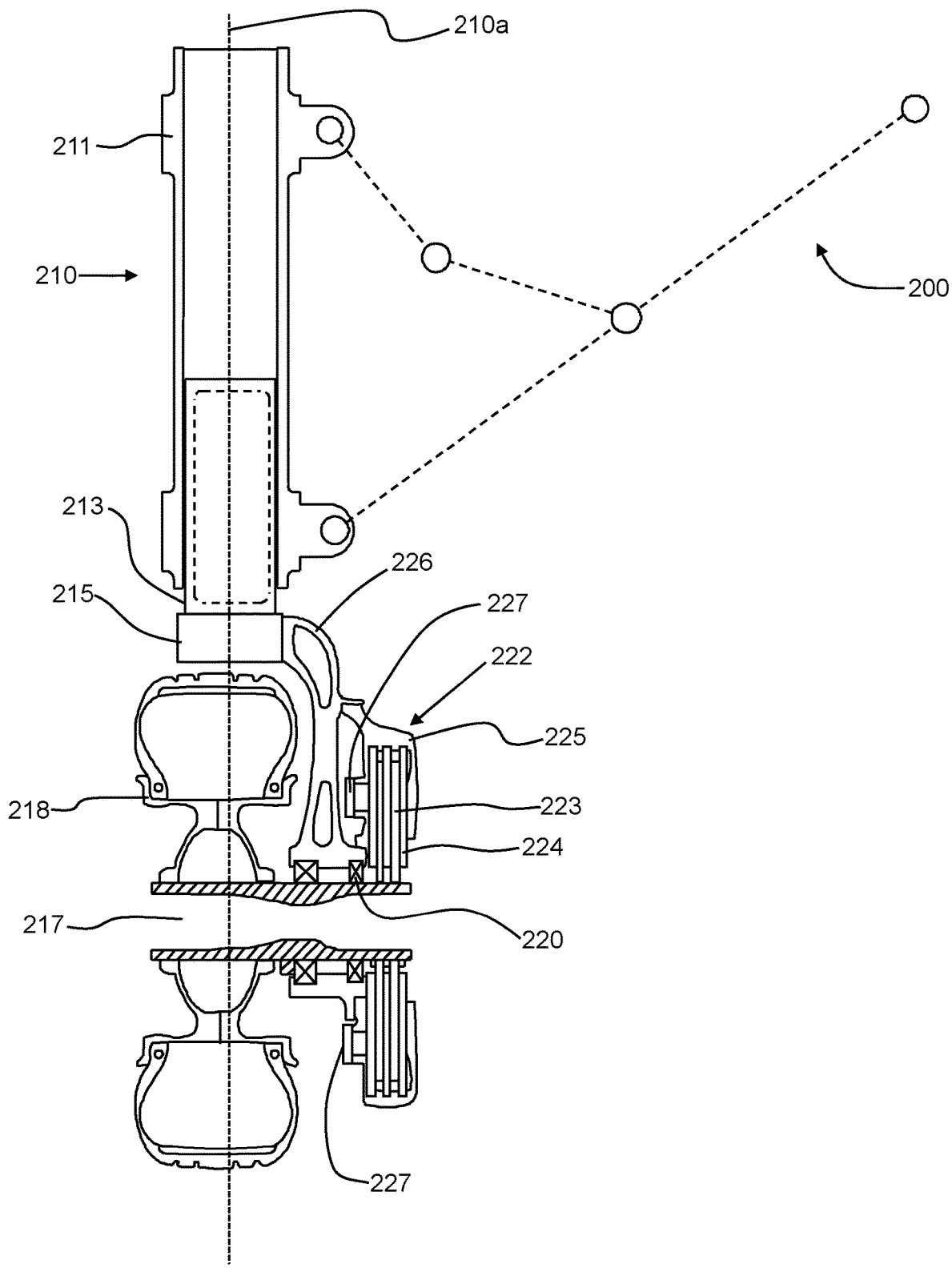
FIG. 3 shows a front view of a left side main aircraft landing gear according to a second embodiment of the invention.

FIG. 3 shows a front view of a left side main aircraft landing gear 200 according to a second embodiment of the invention. This landing gear 200 is similar to landing gear 100 and so, in the following, only the major differences, with respect to the front leg 10, will be described and like reference numerals will be preceded by a "2".

Here, a stirrup connector 226 is used to attach, at a first end, to the attachment flange 215 at the lower end of the slider portion 213 of the leg 210. The stirrup connector 226 provides an offset so that the axle can be mounted to the second end of the stirrup connector at a position offset, downwards and sideways, as seen in FIG. 3. Hence, the axle 217 is mounted to the strut 10 at a point that is not in line with the longitudinal axis 210a of the strut 210. The second end of the stirrup connector 226 provides an axle support and, as can be seen, the axle 217 is rotatably mounted in the stirrup connector 226 by bearings 220.

The wheel 218 is mounted to the axle 217, on an inner side of the stirrup connector 226 (outside in relation to the aircraft as a whole) so that it sits substantially in line with the strut longitudinal axis 210a. This means that low torsional loads are passed into the strut 210, as a result of touchdown and braking.

On the other (outside) side of the stirrup connector 226 (and inside in relation to the aircraft as a whole) is a braking device 222. This is similar to the braking device 22 shown in FIG. 2 in that it has rotors 223 and stators 224 in a casing 225. However, the braking device 222 has a higher aspect ratio so that there are fewer rotors and stators (less width occupied along the axle 217) but they extend further out from the axle 217. The casing of the braking device 225 is fixedly attached to the stirrup connector 226.

It is noted that, this braking device 222 is attached to the stirrup connector 226 by clamping blots 227. Importantly, these are still accessible even when the wheel 218 and tyre 219 are in place.

Figure 4:
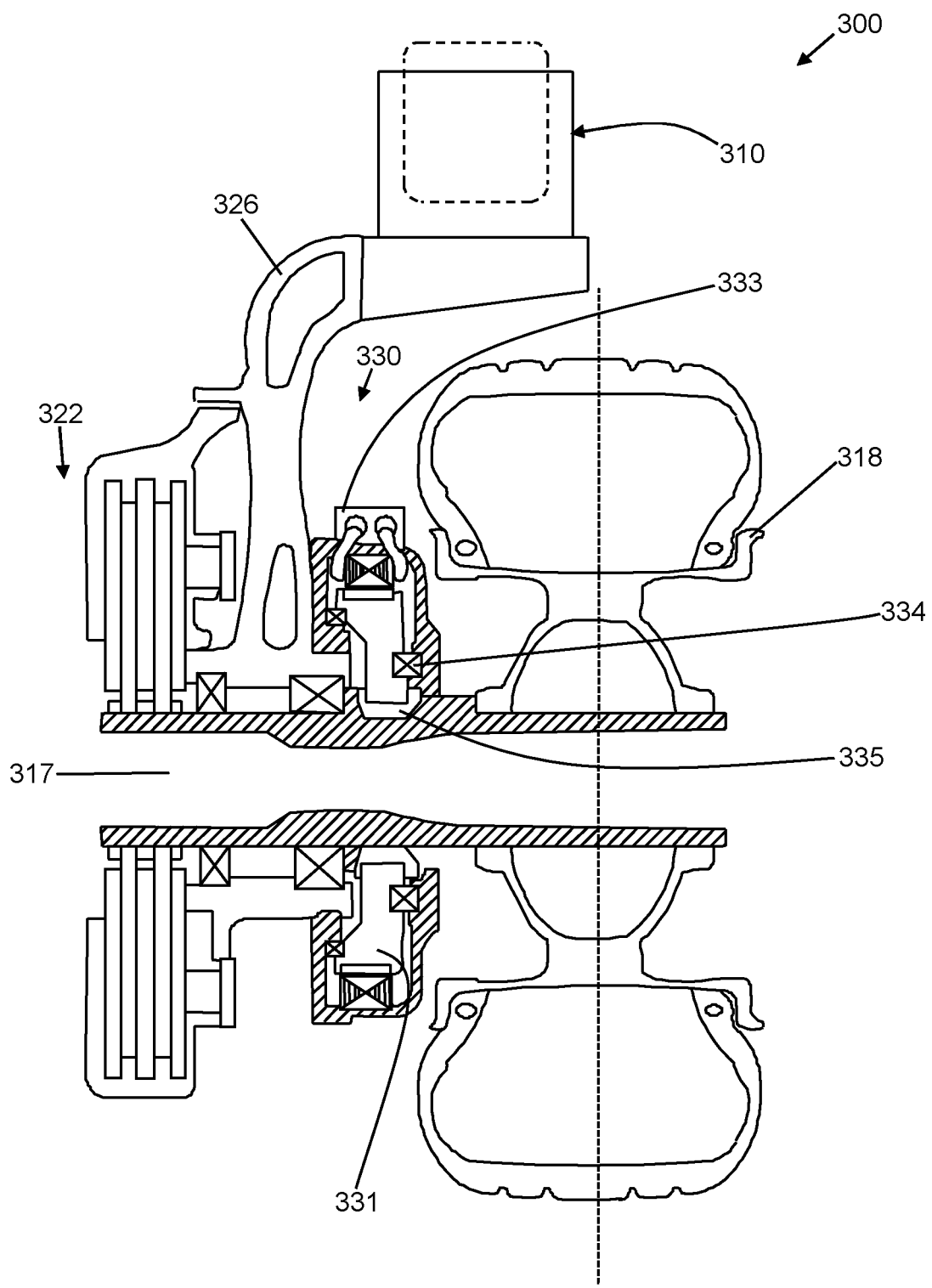
FIG. 4 shows an enlarged front view of a right side main aircraft landing gear according to a third embodiment of the invention.

FIG. 4 shows an enlarged front view of a right side main aircraft landing gear 300 according to a third embodiment of the invention. This landing gear 300 is similar to landing gear 200 (and 100) and so, in the following, only the major differences, with respect to the front leg 10 (or front leg 210), will be described and like reference numerals will start with a "3".

Here, in addition, to the braking device 322 mounted on the outside of the stirrup connector 326 (inside in relation to the aircraft as a whole), a driving mechanism 330 is also mounted on the axle, on the inside of the stirrup connector 326 (outside in relation to the aircraft as a whole), in between the stirrup connector 326 and the wheel 318.

The drive mechanism 330 comprises a rotor 331 rotatable within a stator casing 332. The stator casing 332 is fixedly attached to the stirrup connector 326. The rotors 331 are rotated (with respect to the stators) by an electrical supply and electromagnet 333. The rotors 331 rotate with respect to the stators on bearings 334. The rotors 331 are connected to a "key" 335 on the axle 317 to allow the rotors 331 to rotate the axle 317 in relation to the stirrup connector 326 (and strut 310).

Figure 5:
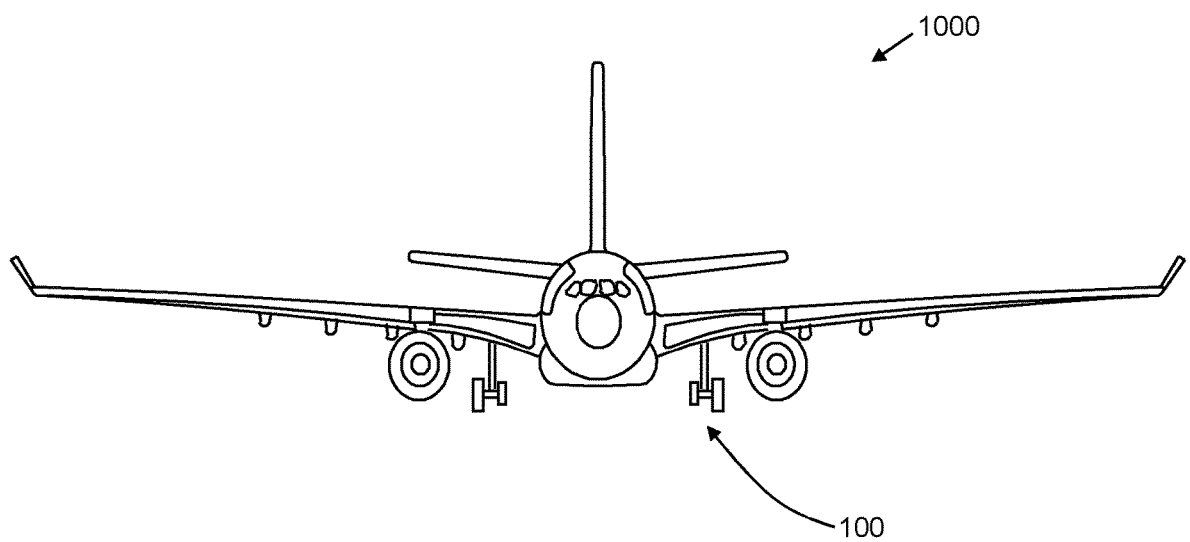
FIG. 5 shows a front view of an aircraft comprising the left side main aircraft landing gear of FIGS. 1 and 2, and a similar right side main landing gear.

FIG. 5 shows a front view of an aircraft 1000 comprising the left side main aircraft landing gear 100 of FIGS. 1 and 2, and a similar right side main landing gear.

In use, the landing gears 100, 200, 300 are extendable and retractable in relation to the aircraft.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the aircraft 1000 shown in FIG. 5, the landing gear 100 is mounted to, and stowable/deployable in relation to, the wings. Alternatively the landing gear may be mounted to the main body/fuselage of the aircraft.

The aircraft 1000 may instead be provided with one or more landing gears as per FIG. 3 or 4.

In the above examples, the landing gear are arranged with tandem wheels (one in front of the other—in the wheel rolling direction). An alternative is to have a twin wheel layout, with the two landing gear struts side-by-side in a front/rear view of the landing gear. Of course, any number of struts (and wheels on the struts) could be used on each landing gear.

The above examples use a "live axle" arrangement. A conventional axle arrangement (where the wheel is rotatable about the hub and the hub is fixed in relation to the strut) may instead be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. An aircraft landing gear comprising:
a first oleo strut for connecting, towards an upper end of the first oleo strut, to an airframe of an aircraft and for supporting, towards a lower end of the first oleo strut, a first axle and a first wheel mountable on the first axle, the first oleo strut comprising a sleeve portion and a slider portion, the slider portion being slidable to act as a piston rod within a hydraulic fluid chamber of the sleeve portion of the first oleo strut,
a second oleo strut for connecting, towards an upper end of the second oleo strut, to an airframe of an aircraft and for supporting, towards a lower end of the second oleo strut, a second axle and a second wheel mountable on the second axle, the second oleo strut comprising a sleeve portion and a slider portion, the slider portion being slidable to act as a piston rod within a hydraulic fluid chamber of the sleeve portion of the second oleo strut,
a hydraulic fluid balancer comprising a balance chamber and at least one separator piston, the separator piston fluidly separating the balance chamber into first and second end sections, the first end section being located on a first side of the separator piston and the second end section being located on a second opposite side of the separator piston, wherein the hydraulic fluid chamber of the sleeve portion of the first oleo strut is fluidly connected to the first section of the balance chamber of the hydraulic fluid balancer and wherein the hydraulic fluid chamber of the sleeve portion of the second oleo strut is fluidly connected to the second section of the balance chamber of the hydraulic fluid balancer,
a frame including a member of bracing struts between the first and second oleo struts, wherein the balance chamber of the hydraulic fluid balancer is located within a bracing strut of the frame, and wherein the balance chamber of the hydraulic fluid balancer is distinct from and enclosed by the bracing strut it is located within,
wherein the bracing strut containing the balance chamber is connected towards an upper end of the first and second oleo struts and acts to connect the first and second oleo struts to the airframe and wherein the bracing strut containing the balance chamber is for pivotally mounting to the airframe such that, in use, the landing gear can pivot about the bracing strut between stowed and deployed positions with respect to the airframe.

2. The aircraft landing gear as claimed in claim 1, wherein slider portion of the first and/or second oleo strut comprises one or more slider fluid chambers.

3. The aircraft landing gear as claimed in claim 1, wherein each of the first and second oleo struts provide an axle support defining a longitudinal axis of an axle to be supported by the axle support and wherein the two axle longitudinal axes both define a same fore-aft rolling direction for wheels mounted on the axles, and wherein the first and second oleo struts are substantially in line with each other in the fore-aft rolling direction.

4. The aircraft landing gear as claimed in claim 1, wherein each of the first and second oleo struts provide an axle support defining a longitudinal axis of an axle to be supported by the axle support and wherein the longitudinal axes of the two axles both define a same fore-aft rolling direction for wheels mounted on the axles, and wherein the first and second oleo struts are substantially in line with each other along an axis perpendicular to the fore-aft rolling direction.

5. The aircraft landing gear as claimed in claim 1, wherein the landing gear comprises an axle mounted towards a lower end of the first and/or second oleo strut, the axle being rotatably mounted to the first and/or second oleo strut such that it can rotate about an axle longitudinal axis,
   a wheel fixedly mounted on the axle such that it rotates with the axle about the axle longitudinal axis, and
   a drive mechanism, for driving rotation of the axle, and/or a braking device, for slowing rotation of the axle, the drive mechanism and/or braking device being mounted on the axle.

6. The aircraft landing gear of claim 1, wherein at least some of the number of bracing struts are made of composite material.

7. The aircraft landing gear as claimed in claim 1, wherein the hydraulic fluid balancer comprises a second separator piston in the balance chamber such that the balance chamber is fluidly separated into three sections; the first end section located between the first separator piston and a first end of the balance chamber, the second end section located between the second separator piston and a second opposite end of the balance chamber, and a third middle section located between the first and second separator pistons.

8. The aircraft landing gear as claimed in claim 7, wherein the third middle section comprises a fluid different to a hydraulic fluid in the first and/or second end sections.

9. The aircraft landing gear as claimed in claim 1, wherein the landing gear comprises a stirrup connector for connecting the first and/or second oleo struts to the corresponding supported axle, wherein the connection point of the stirrup connector with the first and/or second oleo strut is offset from the connection point of the stirrup connector with the axle.

10. The aircraft landing gear as claimed in claim 9, wherein the two connection points are offset in a direction corresponding to a longitudinal axis of the first and/or second oleo strut and offset in a direction perpendicular to the longitudinal axis of the first and/or second oleo strut.

11. The aircraft landing gear as claimed in claim 1, wherein the landing gear comprises an axle supported on the first or second oleo strut and wherein a drive mechanism for driving rotation of the first or second wheel is mounted on the axle.

12. The aircraft landing gear as claimed in claim 11, wherein a braking device, for slowing rotation of the first or second wheel, is also mounted on the axle and wherein the drive mechanism is mounted on the axle on one side of the connection point of a stirrup connector with the axle and the braking device is mounted on the axle on the opposite side of the connection point of the stirrup connector with the axle.

13. The aircraft landing gear as claimed in claim 12, wherein the driving mechanism and/or braking device is mounted on an outside of the stirrup connector and the wheel is mounted on an inside of the stirrup connector.

14. The aircraft landing gear as claimed in claim 13, wherein the wheel is located substantially in line with a longitudinal axis of the first and/or second oleo strut.

15. An aircraft landing gear assembly comprising:
   a first leg for supporting a first wheel at a lower end of the first leg,
   a second leg for supporting a second wheel at a lower end of the second leg, and
   a common shock absorbing unit comprising a first hydraulic fluid chamber associated with the first leg, a second hydraulic fluid chamber associated with the second leg, and a compressible gas chamber which separates the first hydraulic fluid chamber from the second hydraulic fluid chamber,
   wherein in use, loading of the first leg is accommodated by compression of gas in the compressible gas chamber caused by movement of hydraulic fluid into the first hydraulic fluid chamber, and loading of the second leg is accommodated by compression of gas in the compressible gas chamber caused by movement of hydraulic fluid into the second hydraulic fluid chamber,
      further comprising a frame including a number of bracing struts between the first and second oleo struts, wherein the balance chamber of the hydraulic fluid balancer is located within a bracing strut of the frame, and wherein the balance chamber of the hydraulic fluid balancer is distinct from and enclosed by the bracing strut it is located within,
      wherein the bracing strut containing the balance chamber is connected towards an upper end of the first and second oleo struts and acts to connect the first and second oleo struts to the airframe and wherein the bracing strut containing the balance chamber is for pivotally mounting to the airframe such that, in use, the landing gear can pivot about the bracing strut between stowed and deployed positions with respect to the airframe.

16. The aircraft landing gear as claimed in claim 15, wherein the landing gear is a main landing gear.

17. An aircraft comprising the landing gear of claim 15.

18. The aircraft as claimed in claim 17 wherein the aircraft is a passenger aircraft.

19. A method of absorbing a shock experienced by an aircraft landing gear assembly, the landing gear comprising first and second legs and a common shock absorbing unit comprising a first hydraulic fluid chamber associated with the first leg, a second hydraulic fluid chamber associated with the second leg, and a compressible gas chamber which separates the first hydraulic fluid chamber from the second hydraulic fluid chamber, the method comprising the step of:
   absorbing a shock load experienced by the first leg by compression of gas in the compressible gas chamber caused by movement of hydraulic fluid into the first hydraulic fluid chamber, or
   absorbing a shock load experienced by the second leg by compression of gas in the compressible gas chamber caused by movement of hydraulic fluid into the second hydraulic fluid chamber,
   further comprising a frame including a number of bracing struts between the first and second oleo struts, wherein the balance chamber of the hydraulic fluid balancer is located within a bracing strut of the frame, and wherein the balance chamber of the hydraulic fluid balancer is distinct from and enclosed by the bracing strut it is located within, wherein the bracing strut containing the balance chamber is connected towards an upper end of the first and second oleo struts and acts to connect the first and second oleo struts to the airframe and wherein the bracing strut containing the balance chamber is for pivotally mounting to the airframe such that, in use, the landing gear can pivot about the bracing strut between stowed and deployed positions with respect to the airframe.

20. An aircraft landing gear, comprising:
a first oleo strut for connecting, towards an upper end of the first oleo strut, to an airframe of an aircraft and for supporting, towards a lower end of the first oleo strut, a first axle and a first wheel mountable on the first axle, the first oleo strut comprising a sleeve portion and a slider portion, the slider portion being slidable to act as a piston rod within a hydraulic fluid chamber of the sleeve portion of the first oleo strut,
a second oleo strut for connecting, towards an upper end of the second oleo strut, to an airframe of an aircraft and for supporting, towards a lower end of the second oleo strut, a second axle and a second wheel mountable on the second axle, the second oleo strut comprising a sleeve portion and a slider portion, the slider portion being slidable to act as a piston rod within a hydraulic fluid chamber of the sleeve portion of the second oleo strut,
a hydraulic fluid balancer comprising a balance chamber and at least one separator piston, the separator piston fluidly separating the balance chamber into first and second end sections, the first end section being located on a first side of the separator piston and the second end section being located on a second opposite side of the separator piston,
wherein the hydraulic fluid chamber of the sleeve portion of the first oleo strut is fluidly connected to the first section of the balance chamber of the hydraulic fluid balancer and wherein the hydraulic fluid chamber of the sleeve portion of the second oleo strut is fluidly connected to the second section of the balance chamber of the hydraulic fluid balancer;

wherein the landing gear comprises an axle supported on the first or second oleo strut and wherein a drive mechanism for driving rotation of the first or second wheel is mounted on the axle, wherein a braking device, for slowing rotation of the first or second wheel, is also mounted on the axle, and wherein the drive mechanism is mounted on the axle on one side of the connection point of a stirrup connector with the axle and the braking device is mounted on the axle on the opposite side of the connection point of the stirrup connector with the axle.

21. The aircraft landing gear of claim 20, wherein the driving mechanism and/or braking device is mounted on an outside of the stirrup connector and the wheel is mounted on an inside of the stirrup connector.

22. The aircraft landing gear of claim 21, wherein the wheel is located substantially in line with a longitudinal axis of the first and/or second oleo strut.

* * * * *